March 4, 1969  J. H. LANCOR, JR  3,431,047
FILM MAGAZINE AND RECEPTACLE
Filed Dec. 3, 1965
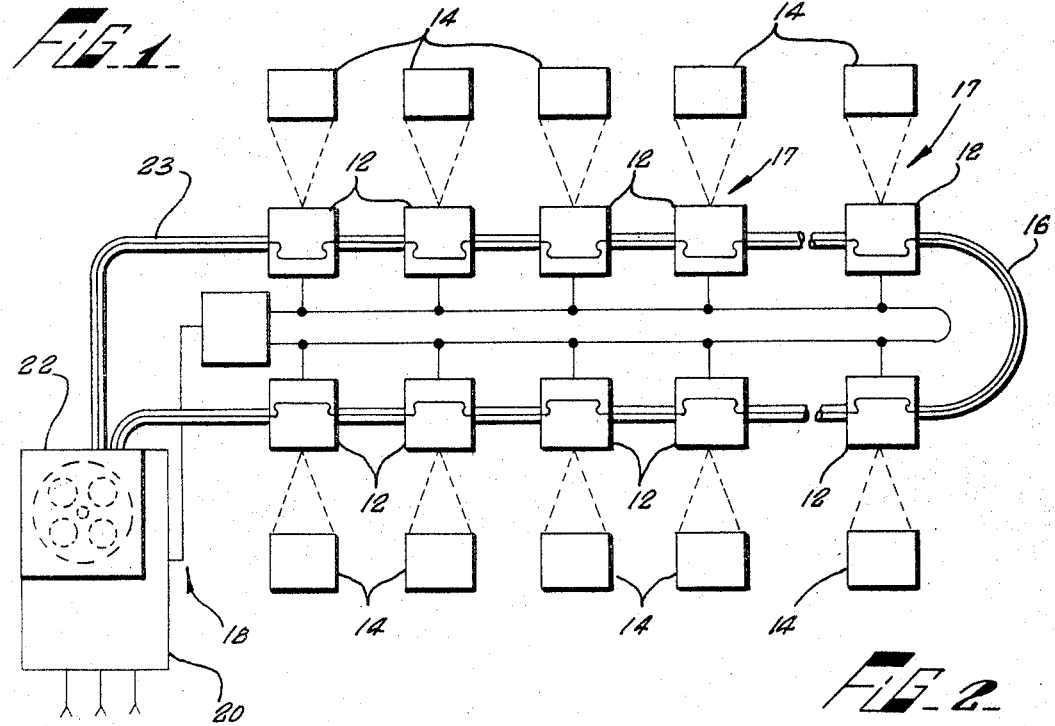
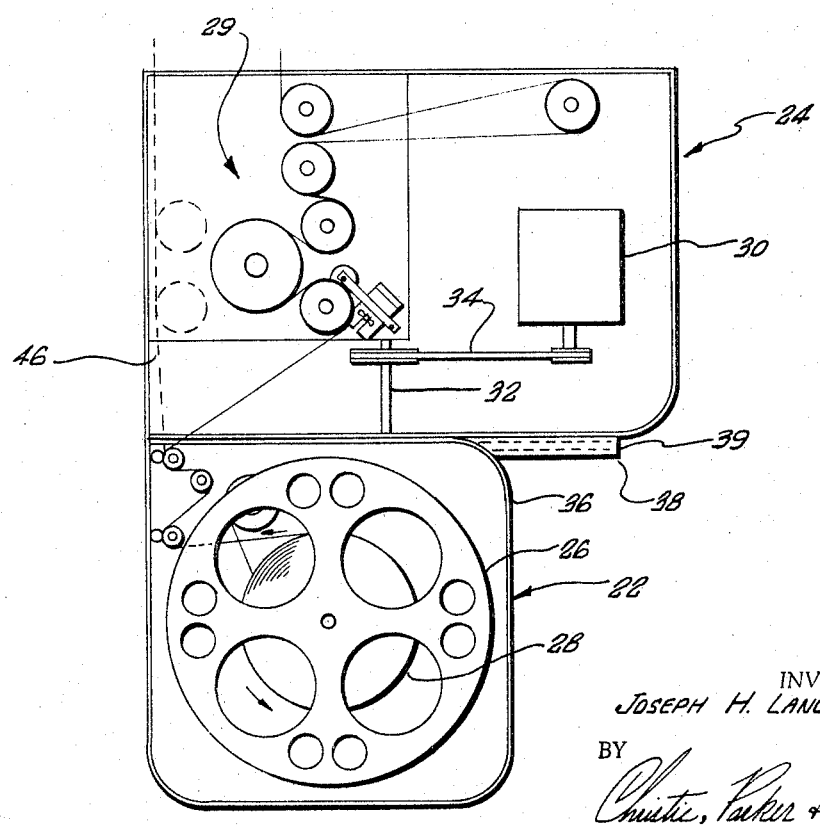
INVENTOR.
JOSEPH H. LANCOR, JR.
BY
Christie, Parker & Hale
ATTORNEYS.

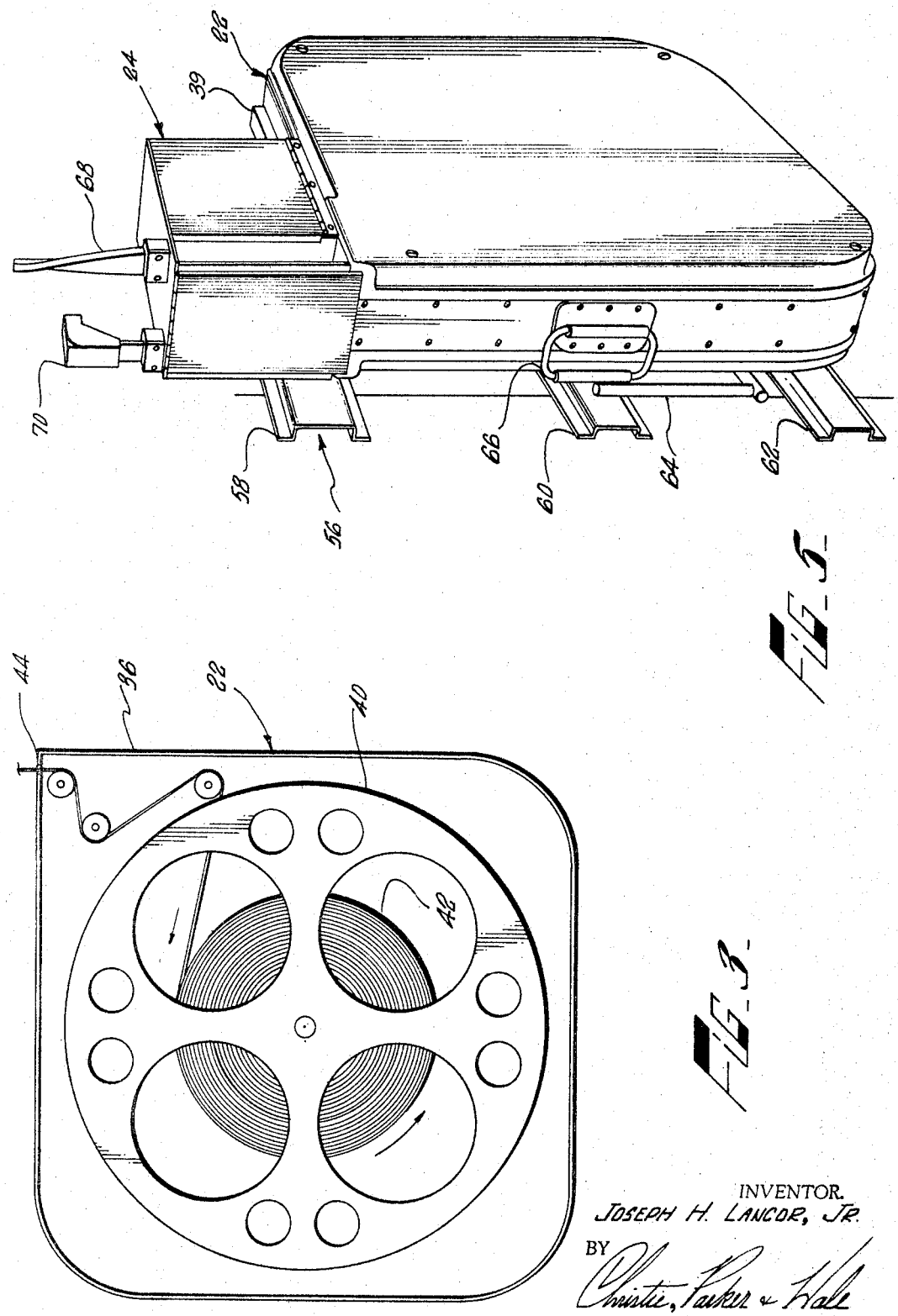

March 4, 1969   J. H. LANCOR, JR   3,431,047
FILM MAGAZINE AND RECEPTACLE
Filed Dec. 3, 1965
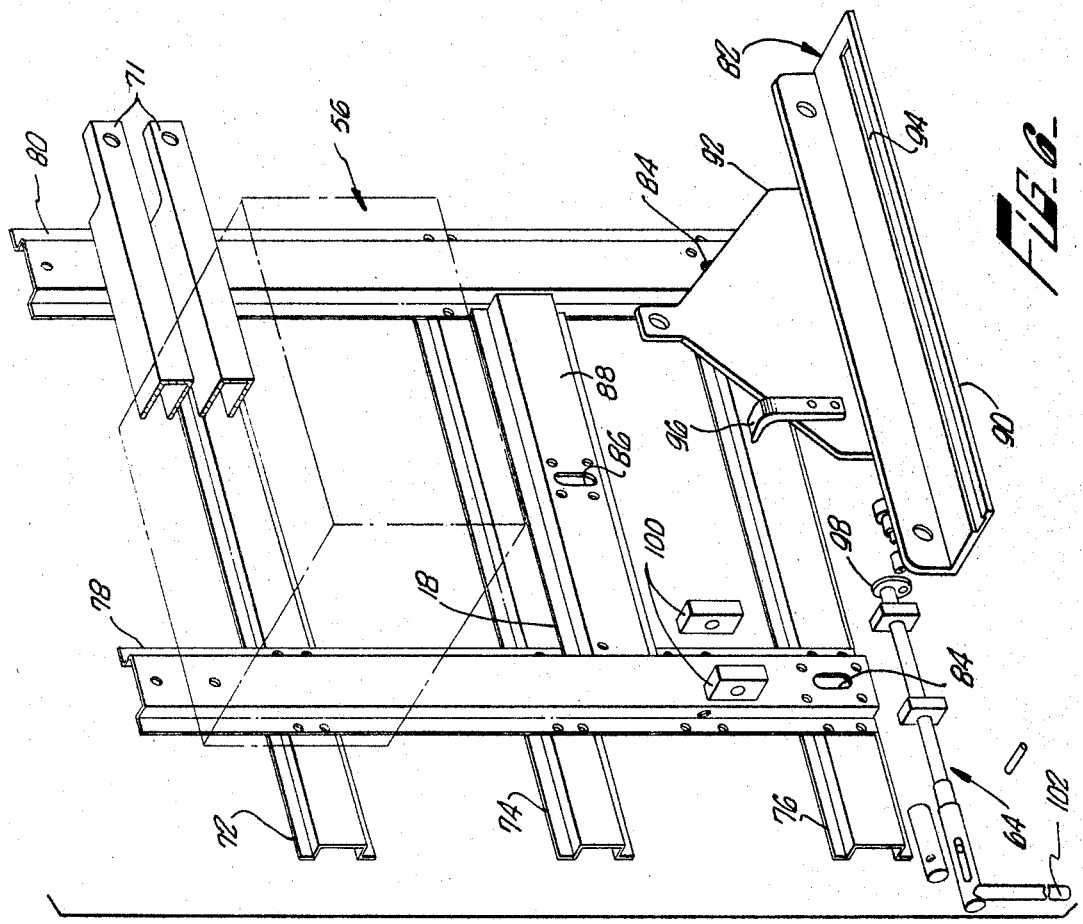
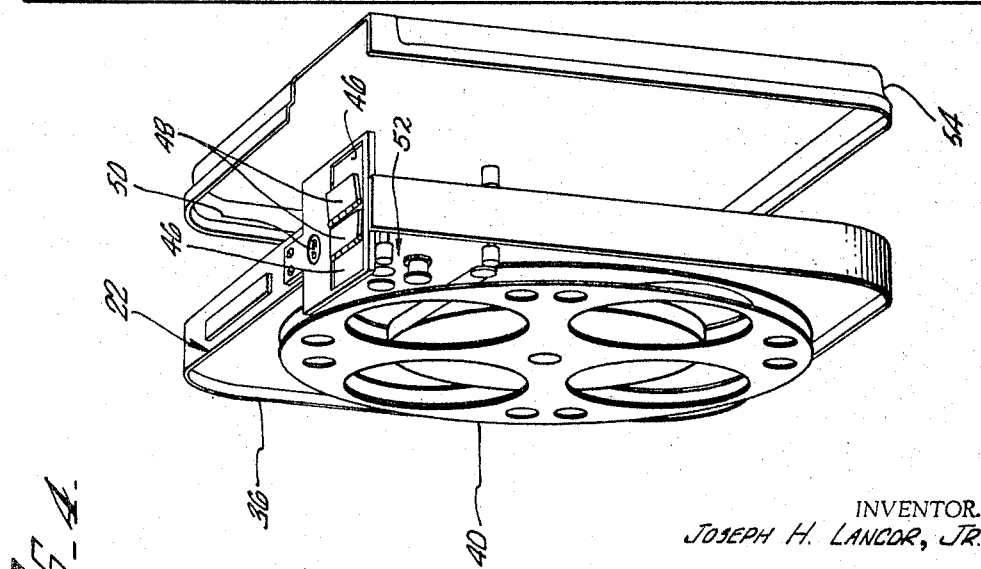
INVENTOR.
JOSEPH H. LANCOR, JR.
BY
Christie, Parker & Hale
ATTORNEYS

United States Patent Office 3,431,047
Patented Mar. 4, 1969

3,431,047
FILM MAGAZINE AND RECEPTACLE
Joseph H. Lancor, Jr., Arcadia, Calif., assignor to Consolidated Electrodynamics Corporation, Pasadena, Calif., a corporation of California
Continuation-in-part of application Ser. No. 485,768, Sept. 8, 1965. This application Dec. 3, 1965, Ser. No. 511,429
U.S. Cl. 352—72                6 Claims
Int. Cl. G03b 23/02

ABSTRACT OF THE DISCLOSURE

A film supply and take-up station for motion picture film. The station comprises a mounting structure for a cassette and the cassette itself. A supply and take-up reel are mounted in a coaxial relationship on opposite sides of a partition in the cassette. Suitable indexing means are provided on the cassette and the mounting structure for quickly registering and subsequently locking the cassette in position on the mounting structure. Auxiliary drive means are mounted on the structure and are adapted for operative engagement with a drive linkage on the cassette for providing power to turn the supply and take-up reels.

---

This is a continuation-in-part of application Ser. No. 485,768, filed Sept. 8, 1965 now U.S. Patent 3,379,488.

This invention relates to film magazines and receptacles therefor and in particular to a portable film cassette for installation in a receptacle located in multipassenger aircraft.

In the application referenced above there is described a second generation system for providing motion picture entertainment in passenger vehicles such as aircraft. Briefly the system comprises a plurality of projector stations located within an enclosure. A film strip is advanced from projector to projector providing a sequential presentation of the information recorded on the film. Provided as one integral part of the system is a portable container for coaxially mounted film reels designed for location in a receptacle or indented opening in a bulkhead within the aircraft.

The present invention is concerned with this particular aspect of that system and provides a film magazine comprising two sides and two rotatable shafts mounted on the extending in opposite directions in the magazine. The shafts are preferably coaxial and are adapted to have motion picture film reels mounted on them. In addition drive train means are mounted in the magazine for rotatably driving the two shafts. The drive train means are adapted for mechanical interconnection with a source of driving power located in a mounting means for removably receiving the magazine. Means are also provided for registering the magazine in a predetermined position in the mounting so as to permit interlock with the drive means.

The combination of the film supply and takeup magazine, magazine receptacle, a film path external to the cassette and a retained length of film (trailer) located in the film path comprises a film distribution and takeup system which is well suited for use in a multi-projector aircraft entertainment system. Such an arrangement permits quick installation of a film magazine (cassette) having a full supply and an empty takeup reel. Following magazine installation, two film splices are all that are necessary in order to ready the system for operation. The two splices are connections of the film leader to one end of the retained trailer and connection of a short leader on the takeup reel to the other end of the retained trailer.

Removal of the cassette after a showing is equally straightforward. A new retained trailer loaded into the system from the supply reel need only be cut from the end of the film on the takeup reel to ready the cassette for removal. Provision of a single locking means for engaging the cassette with the cassette receptacle further aids the quick installation and removal of the cassette.

These and other aspects of the invention will be better understood by reference to the following figures in which:

FIG. 1 is a diagram of a multi-projector entertainment system having a magazine receptacle of the present invention;

FIG. 2 is a diagrammatic elevational view of the supply reel side of a magazine of this invention and of a motor drive unit associated with the magazine;

FIG. 3 is an elevational view of the takeup side of the magazine;

FIG. 4 is a perspective view of the takeup reel, cassette, and cassette cover illustrating the point of interconnection with the cassette drive train and a pair of film locks which are provided at the top of the cassette;

FIG. 5 is a perspective view showing a covered cassette locked into position on a cassette receptacle in engagement with a motor drive unit for the cassette; and FIG. 6 is a perspective view showing an unloaded cassette receptacle with its associated motor drive unit.

Referring now to FIG. 1, there is shown therein a system diagram of a multi-projector motion picture entertainment system adapted to transport a film serially through the various projectors in the system. As shown in FIG. 1 the system comprises a plurality of film projector and transport mechanisms 12 adapted to project images recorded on the film to projection screens 14 arranged in a predetermined location relative to each projector and transport mechanism. The projector and transport mechanism and screen together comprise a plurality of projection stations 17 which are interconnected by means of a duct 16 described in greater detail in copending application Ser. No. 628,191 filed Feb. 8, 1967 now U.S. Patent 3,421,675. The duct 16 is connected to a supply and takeup point 18 comprising a receptacle 20 and a film magazine or cassette 22 mounted on the receptacle. The film magazine 22 is provided with a supply and takeup reel, only one of which is shown in FIG. 1 for providing the start and terminus of a film supply and distribution system. Duct 16 is attached to points on the distribution and takeup station 18 which communicate with the supply and takeup reels in cassette 22. A length of film 23 located within duct 16 extends from a point adjacent the supply reel to a point adjacent to the takeup reel. This length of film is designated a "retained" trailer for ease of reference. This designation is also descriptive of the function of this length of film since it is threaded into the system after each presentation and left there for subsequent interconnection to a new supply of film in a new film cassette.

Certain additional details of the supply side of the film cassette and a motor drive unit for rotatably driving the supply reel are shown in FIG. 2. As shown therein motor drive unit 24 is located above the cassette 22 which has a supply reel 26 containing a supply of film 28 which is paid out into the system. Certain control apparatus 29 is provided in unit 24 for performing such functions as maintaining a predetermined length of film between the unit 24 and the first projector in the system and sensing the occurrence of the end of the film. The unit is also provided with an electrical motor 30 interconnected to a drive shaft 32 by means of belt 34 for providing the source of driving power for turning the supply reel 26. Shaft 32 is adapted to interconnect with a drive train (not shown) provided on the support 36 upon which reel 26 is mounted. A rod 38 located within a slot or groove 39 mounted on the bottom of the motor drive unit 24 provides one point of contact between the cassette and cassette receptacle for accurate registration of the cassette relative to the motor drive unit when it is mounted on the receptacle. The use of the registration means is another facet of the apparatus of this invention to provide a capability of quick mounting and dismounting of the cassette.

The takeup side of cassette 22 is shown in FIG. 3. A takeup reel 40 is mounted on support 36 and has a length of film 42 wound thereon corresponding to the amount of film that would be on the takeup reel at some point in the course of a film showing. The film shown entering cassette 22 through aperture 44 is part of the film strand shown passing through motor drive unit 24 in dotted section in FIG. 2.

A perspective view of the takeup reel 40 mounted on the cassette 22 is shown in FIG. 4 to illustrate the web configuration of support 36 for supporting a takeup reel on one side of the web and a coaxial supply reel on the other side. A pair of film locks 46 are located at the top of the support 36. These film locks are used to clamp and hold leaders coming off of the supply and takeup reels respectively when the cassette is not installed in the system. By providing sponge pads 48 on the side of each door adjacent the reel compartments, the film is securely held in place until it is ready to be spliced to the retained trailer in the system. Also shown in FIG. 4 is the point of access 50 to a drive train or drive linkage provided interiorly of the web between the supply and takeup sides for rotatably driving the supply and takeup reel. This point is mechanically interconnected to drive shaft 32 on the motor drive unit when the cassette is mounted and registered on the cassette receptacle and raised into a position abutting the motor drive unit as shown in FIGS. 2 and 5.

A portion of the braking mechanism associated with the two film reels is illustrated at 52. This braking system is more fully described in copending application Ser. No. 621,375 filed Jan. 6, 1967 now U.S. Patent 3,398,914. A cassette cover 54 is shown spaced a short distance from cassette 22. When in use with the supply and takeup reels mounted in the cassette, both sides of the cassette are provided with covers similar to cover 54. The covers are attached and secured to the cassette by means of a quick releasing Dzus fasteners (see Reference Issue, Fasteners, Machine Design, Mar. 11, 1965, p. 187).

A perspective view of cassette 22 installed in a receptacle 56 and registered with a motor drive unit 24 is shown in FIG. 5. Unit 24 is permanently affixed to member 58 of cassette receptacle 56. The cassette 22 is connected to the unit by placing it adjacent receptacle members 60 and 62 on a plate or pan (see FIG. 6) 82 and located in proper registration with slot 39 and a slot 94 (see FIG. 6) in plate 82. Mechanical interconnection between the unit and the cassette is accomplished by rotating locking lever 64 counterclockwise such that the cassette is raised into close abutment with the bottom of drive unit 24. Similarly, release of the cassette is provided by clockwise rotation of the locking lever. A carrying handle 66 is provided on the side of the cassette for portability. Extending from the top of drive unit 24 are two sections 68 and 70 of duct 16 carrying film from the supply reel to the system and returning film from the system to the takeup reel.

An exploded view of an empty cassette receptacle 56 is shown in FIG. 6. The motor drive unit 24 is attached to the receptacle by a pair of mounting brackets 71. The receptacle comprises three horizontal supports 72, 74 and 76 respectively upon which are mounted two vertical supports 78 and 80 respectively. A fourth horizontal support member 88 is mounted on vertical members 78 and 80. A support 82 for a film cassette is adapted to be slidably mounted within slots 84 in the base of vertical members 78 and 80 and slot 86 in member 88 to provide a three point suspension for the cassette. Support 82 comprises a base plate 90 having a triangular vertical extension 92 mounted along the side thereof adjacent the receptacle. Base plate 90 is attached to supports 78, 80 at slots 84 by securing means which are adapted for sliding movement within the slots between two vertical positions. A bolt passing through the apex of extension 92 is adapted to slidably engage slot 86.

A slot 94 is provided in the base plate 90 which together with slot 39 shown in FIG. 2 engage pins or rods extending from the film cassette to provide registration of the cassette within the receptacle. Mounted at the rear of vertical plate 92 is a cam follower lever 96. The inner surface of cam follower 96 is adapted to be engaged by a cam 98 provided at one end of locking lever 64. As shown in FIG. 6 lever 64 is adapted for mounting at one side of the receptacle through guides 100 mounted on vertical support 78. Counterclockwise rotation of locking lever handle 102 causes engagement of cam 98 with the cam follower 96 raising platform 82 such that when a cassette is mounted on plate 82, it is raised into locking engagement with the drive shaft on the motor drive unit. Likewise clockwise rotation of the handle 102 lowers the plate permitting disengagement of the cassette from the receptacle.

In addition to providing means for easily mounting a film magazine or cassette, the receptacle also provides a support for a cassette which is capable of supporting up to 9 g's of inertial force exerted in any direction on the magazine.

What is claimed is:

1. A film distribution and take-up system comprising:
   a film cassette receptable including a support structure and a platform movably mounted on the support structure;
   a motor drive unit mounted on the receptacle, the unit having a drive shaft extending therefrom, said shaft being adapted to interlock with a drive linkage on a motion picture film cassette;
   a portable motion picture film cassette having a pair of coaxial film reel shafts, each of the shafts being mounted on opposite sides of a web dividing the cassette into two sections;
   a film supply reel and a film take-up reel mounted respectively on each of the coaxial shafts;
   a drive linkage mounted in the cassette for rotatably driving the shafts and film reels;
   a lever operated cam mounted on the receptacle; and
   a cam follower mounted on the movable platform in operative engagement with said cam.

2. A supply and take-up station for a motion picture film distribution system comprising:
   a cassette support receiving and registering a film cassette in a predetermined position, the cassette having a supply side and a take-up side;
   two coaxial rotatable shafts mounted in the cassette, each of the shafts extending in opposite directions on the supply and take-up sides respectively of the cassette, the shafts being adapted for mounting motion picture film reels thereon;
   a drive unit mounted on the support, the unit having a drive shaft releasably engaging a drivee linkage in the cassette rotatably driving the two coaxial shafts; and
   means for urging the drive shaft on the drive unit into operative engagement with the cassette drive linkage, the urging means comprising a locking lever and a movable platform provided on the cassette support, the platform being adapted to support the cassette whereby operation of the lever moves the cassette and platform relative to the cassette support producing engagement of the drive shaft and drive linkage.

3. A film distribution and take-up system comprising:
   a film cassette receptacle including a support structure and a platform movably mounted on the support structure;

fixed drive means mounted on the receptacle, said means being adapted to operatively engage a drive linkage on a motion picture film cassette;

a portable motion picture film cassette having a pair of coaxial film reel shafts extending in opposite directions removably mounted on the platform;

a film supply reel and a film take-up reel mounted respectively on each of the coaxial shafts;

a drive linkage mounted in the cassette for rotatably driving the shafts and film reels; and operating means mounted on the receptacle for moving the platform to produce engagement and release between the drive means and drive linkage.

4. A film distribution and take-up system according to claim 3 wherein the operating means includes means for locking the drive means and drive linkage in the engaged position.

5. A film distribution and take-up system according to claim 4 including means external of the cassette and cassette receptacle defining a film path between the supply and take-up reels.

6. A film distribution and take-up system according to claim 4 wherein the operating means includes a lever operated cam mounted on the receptacle and a cam follower mounted on the movable platform in operative engagement with the cam.

References Cited

UNITED STATES PATENTS

| | | | |
|---|---|---|---|
| 1,568,067 | 1/1926 | Howell | 352—78 |
| 1,944,023 | 1/1934 | Ford | 352—72 |
| 2,476,705 | 7/1949 | Coutant et al. | 352—78 |
| 2,868,067 | 1/1959 | Schwimmer | 352—75 |
| 3,022,165 | 2/1962 | Solow et al. | 352—235 |
| 3,342,431 | 9/1967 | Mouissie | 352—78 |
| 2,466,524 | 4/1949 | Williams | 352—78 |

NORTON ANSHER, *Primary Examiner.*

M. H. HAYES, *Assistant Examiner.*

U.S. Cl. X.R.

352—78